US012811438B2

(12) United States Patent
Mirmozafari

(10) Patent No.: US 12,811,438 B2
(45) Date of Patent: Nov. 24, 2026

(54) MECHANICALLY RECONFIGURABLE REFLECTOR ANTENNA FOR EFFICIENT WIRELESS POWER BEAMING SYSTEMS

(71) Applicant: Maxwave LLC, Waunakee, WI (US)

(72) Inventor: Mirhamed Mirmozafari, Waunakee, WI (US)

(73) Assignee: Maxwave LLC, Waunakee, WI (US)

( * ) Notice: Subject to any disclaimer, the term of this patent is extended or adjusted under 35 U.S.C. 154(b) by 0 days.

(21) Appl. No.: 19/287,295

(22) Filed: Jul. 31, 2025

(65) Prior Publication Data

US 2026/0039151 A1 Feb. 5, 2026

Related U.S. Application Data

(60) Provisional application No. 63/677,479, filed on Jul. 31, 2024.

(51) Int. Cl.

*H02J 17/00* (2006.01)
*H01Q 1/28* (2006.01)
*H01Q 3/46* (2006.01)
*H02J 50/20* (2016.01)

(52) U.S. Cl.

CPC ............... *H02J 50/20* (2016.02); *H01Q 1/28* (2013.01); *H01Q 3/46* (2013.01)

(58) Field of Classification Search

CPC .............. H02J 50/20; H01Q 1/28; H01Q 3/46
See application file for complete search history.

(56) References Cited

U.S. PATENT DOCUMENTS

2014/0354064 A1* 12/2014 Tseliakhovich .......... H01Q 1/42 307/104
2018/0183152 A1* 6/2018 Turpin ................. H01Q 25/008
2024/0030617 A1* 1/2024 Bieber ..................... H01Q 3/18
2024/0120776 A1* 4/2024 Rodenbeck ............. H02J 50/20
2026/0202537 A1* 7/2026 Baker ..................... G01S 13/72

OTHER PUBLICATIONS

Chahat, N. et al., “Ka-band Deployable Mesh Reflector Antenna Compatible with the Deep Space Network”, 2017 11th European Conference on Antennas and Propagation (EUCAP), pp. 546-548.

* cited by examiner

*Primary Examiner* — Menatoallah Youssef
*Assistant Examiner* — Esayas G Yeshaw
(74) *Attorney, Agent, or Firm* — Andrus Intellectual Property Law, LLP

(57) ABSTRACT

A method of wireless power beaming to a receiver antenna requires mechanical scanning of the transmitting antenna to locate the receiver antenna on the target. The target can be stationery or moving such as a drone. The transmitting antenna includes a feed antenna and a reconfigurable reflector antenna. The reconfigurable reflector antenna can be a reflectarray controlled by micromotors, which are used to adjust the location of the focal point to be commensurate with the target. Also, the distance between a feed antenna and the reconfigurable reflector antenna is adjusted to change the shape and power density at the focal point in order to optimize power recovery at the receiver antenna.

8 Claims, 10 Drawing Sheets

MECHANICALLY RECONFIGURABLE REFLECTOR ANTENNA FOR EFFICIENT WIRELESS POWER BEAMING SYSTEMS

CROSS-REFERENCE TO RELATED APPLICATION

The present application claims priority of U.S. Provisional Patent Application No. 63/677,479, filed Jul. 31, 2024, the content of which is incorporated herein by reference in its entirety.

FIELD OF THE INVENTION

The invention pertains to wireless power beaming systems, and in particular to a mechanically reconfigurable reflector antenna.

BACKGROUND

Wireless power beaming (WPB) is a transformative technology that enables the transmission of electrical power without the need for wires or transmission lines. Using electromagnetic waves, large amounts of power are transferred over the air, which has the potential to revolutionize numerous industries, particularly in scenarios where implementing wire-based infrastructure is not feasible.

Among the few solutions for wireless power beaming, microwave power transfer (MPT) stands out as a reliable, resilient, and long-range power transfer solution. However, some technological barriers need to be overcome before the potential of microwave power transfer can be fully unlocked. FIG. 1 depicts a schematic of a wireless power beaming system 100. End-to-end power efficiency (referred to simply as efficiency hereafter unless otherwise specified) is defined as $$\eta = \frac{P_{Out}}{P_{In}}.$$

Microwave power transfer technologies that have been developed so far have poor efficiency for ranges beyond 10 m. Reported power transmission efficiencies for distances between 10 m to 100 m are below 10% and those implemented for longer ranges (>1 Km) have less than 1% efficiency which sharply decreases beyond this range. While deploying huge antennas at both transmitter and receiver sides can slightly enhance efficiency, this renders wireless power beaming systems unfeasible for many applications. Existing microwave power transfer systems mostly use the microwave frequency range (e.g., 2.45, 5, and recently 10 GHz) primarily due to the availability and maturity of RF (radio frequency) components at these frequencies. Distances beyond 10 m fall within the far-field range of moderate-size antennas at these frequencies. Therefore, the diffraction of the RF beam hinders an efficient microwave power transfer between transmitter 102 and receiver 104 antennas at these frequencies.

Referring to the nomenclature in FIG. 1, the efficiency (η) of a wireless power beaming system 100 can be expressed through its constituting parameters as follows:

$$\eta = \frac{P_{Out}}{P_{In}} = \frac{P_{TX-in}}{P_{In}} \times \frac{P_{TX-out}}{P_{TX-in}} \times \frac{P_{RX-in}}{P_{TX-out}} \times \frac{P_{RX-out}}{P_{RX-in}} \times \frac{P_{Out}}{P_{RX-out}}$$

Increasing the efficiency of each of these contributors eventually enhances the overall efficiency of the system.

This invention specifically addresses the transmitter (TX) antenna 102, a critical component of a wireless power beaming system 100. The efficiency contributor that is directly associated with the TX antenna 102 in the above equation is $$\left(\frac{P_{TX-out}}{P_{TX-in}}\right)$$

which is mostly attributed to loss components in the TX antenna systems. Beyond this efficiency parameter, the TX antenna 102 is pivotal in wave engineering to ensure that the transmitted power is effectively focused on the aperture of receiver antenna 104. This precise focusing is essential for increasing the power transfer over the air, thereby maximizing $$\left(\frac{P_{RX-in}}{P_{TX-out}}\right)$$

the third term of the equation. The ability to precisely control the amplitude and phase of fields on the TX aperture 102 drastically impacts the power transfer efficiency over the air. For example, an ideal TX antenna system 102 for wireless power beaming 100 would have zero loss and the capability to focus the entire RF power ($P_{Tx-out}$) on the receiver antenna 104. This translates to 100% efficiency for the second and third terms of the above equation. Finally, the TX antenna 102 can also impact rectification efficiency $$\left(\frac{P_{Out}}{P_{RX-out}}\right)$$

the fourth term of equation through controlling the power density on the receiver antenna 104. Rectifier 114 typically achieves maximum efficiency at certain input power level and this can be controlled with the transmitter antenna 102.

SUMMARY OF THE INVENTION

This invention is directed to the design of a nearly ideal transmitting (TX) antenna, optimized for performance in the near-field zone. In this zone, exceptional power efficiency over the air can be achieved while minimizing power spillover. Within this near-field region, the antenna's radiation has not yet undergone diffraction and can be further focused using a non-diffractive beam, as illustrated in FIG. 2. By adjusting the phase and amplitude of the RF field on the TX aperture, a focusing radiative beam is generated. The shape and location of the beam's focal point can be adjusted by controlling these parameters. This capability enables efficient and long-range power beaming to moving objects.

The invention pertains to a method of wireless power beaming to a receiver antenna. In one exemplary embodiment, the receiver antenna is located on a moving object such as a drone, although the invention is useful even if receiver antenna is stationery. A feed antenna, preferably an off-axis feed antenna resulting in zero blockage loss, transmits electromagnetic energy in a low-gain pattern towards a mechanically reconfigurable reflector antenna that transmits a high-gain reflector beam. The reflector antenna and the feed antenna are simultaneously rotated around their axes for azimuth and elevation scanning in order to mechanically detect the directional position of the receiver antenna and mechanically position the axis of the reflector antenna towards the detected receiver antenna. Once the axis of the reflector antenna is positioned towards the detected receiver antenna, the next step is to adjust the longitudinal location of the focal point of the high-gain reflector antenna in the direction of the receiver antenna in order to move the focal point commensurate with the location of the receiver antenna. The next step is to adjust the distance between the feed antenna and the reconfigurable reflector antenna to change the shape and power density at the focal point in order to optimize power recovery at the receiver antenna (i.e., beam broadening). The latter two steps are performed in tandem and may repeat a few times to achieve the optimized power density and power recovery at the receiver.

In the first exemplary embodiment, the reconfigurable reflector antenna is a reflectarray having a central reflective disc surrounded by concentric reflective rings wherein beam collimation is achieved through phase adjustment of the incident low-gain beam from the feed antenna. The height of each ring is adjusted, for example, using dedicated micro-motors in order to adapt the focal point of the high-gain beam.

In another embodiment, the reconfigurable reflector antenna is a symmetric circular reflector, and the focal point of the high-gain reflector beam is adjusted by changing the curvature of the reconfigurable reflector antenna. For example, a mesh reflector that has repositionable, radially extending ribs that are moved in unison to adjust the curvature of the mesh reflector can serve as the reconfigurable reflector antenna.

In either embodiment, receiver includes receiver antenna backed by rectifier that converts received electromagnetic energy into direct current (DC) power.

Other features and advantages of the invention may be apparent to those skilled in the art upon reviewing the drawings and the following description thereof.

BRIEF DESCRIPTION OF THE DRAWINGS

FIG. 3A illustrates beam scanning. FIG. 3B illustrates range focusing. FIG. 3C illustrates beam broadening.

FIG. 6 shows an illustrative power density gradually increasing toward the center of the receiver antenna.

DETAILED DESCRIPTION

Figure 1:
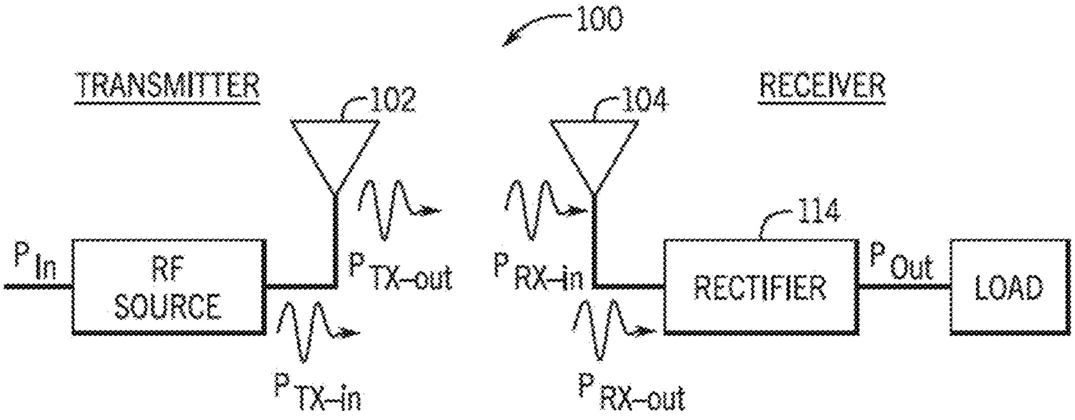
FIG. 1 is a schematic drawing of a wireless power beaming system including a standalone RF (radio frequency) source.
Figure 2:
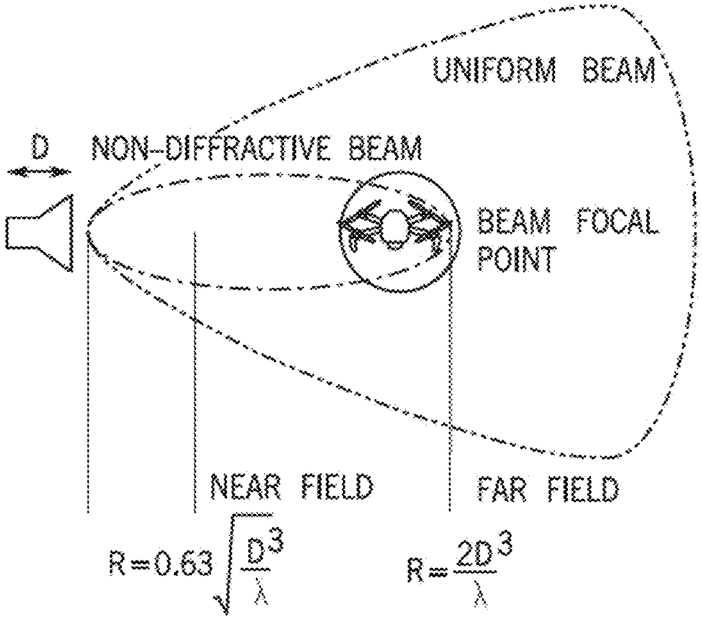
FIG. 2 is a drawing illustrating RF transmission from a TX antenna at the near-field (Fresnel zone) of TX antenna using a non-diffractive beam. The focal point of the non-diffractive beam is encircled and has relatively high power density.
Figure 3A:
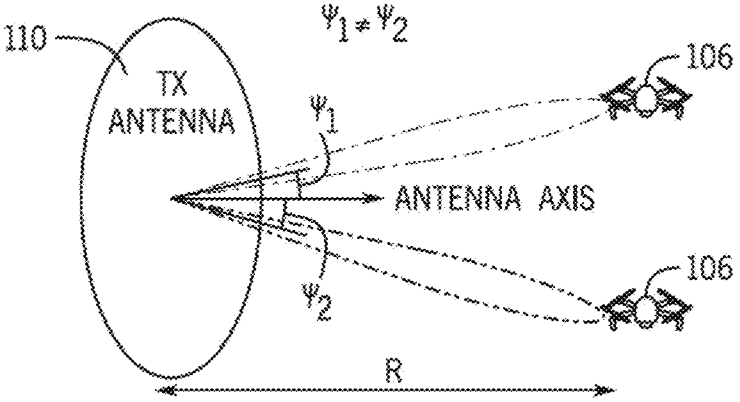
FIGS. 3A-C schematically illustrate three adjustments in controlling the beam of the TX antenna for efficient power beaming to moving objects.
Figure 3B:
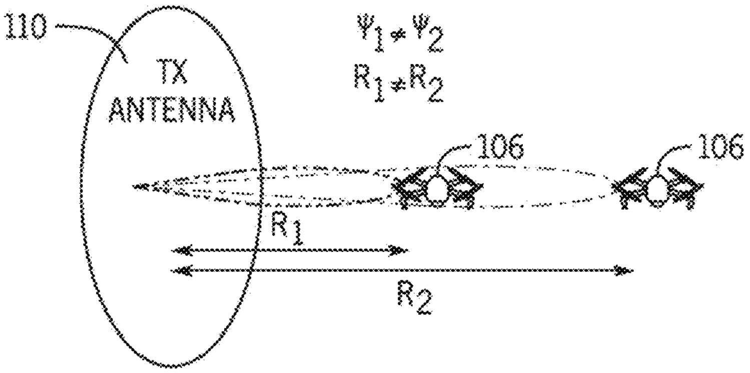
Figure 3C:
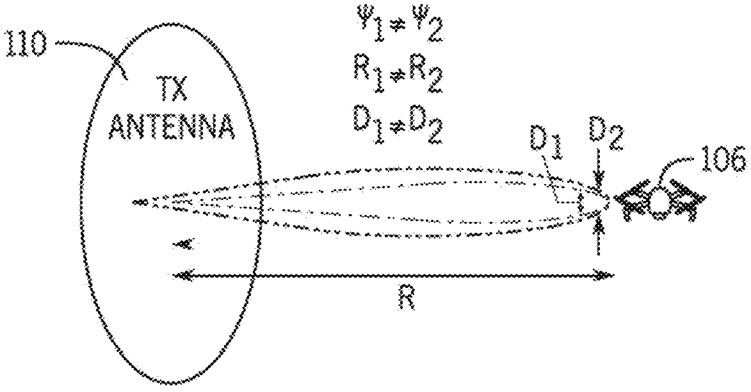

The antenna systems in this invention are designed for point-to-point wireless power beaming for both stationery and moving objects. The latter includes UAVs, USVs, electrical vehicles, and others. Efficient power beaming to moving objects requires significant control of the main beam of the transmitter antenna 102. These requirements are delineated in FIGS. 3A-C. The first requirement, shown in FIG. 3A, is the conventional scanning of the antenna beam which is a well-known technique. The second requirement, shown in FIG. 3B, is the adaptive range focusing of the focal point along the longitudinal axis of the TX antenna. This action keeps the focal point of power on the moving target 106 getting closer or farther away from the TX antenna 102. The third requirement, shown in FIG. 3C, is power density adjustment on the target 106. Essentially, this step allows for adjusting the shape of the focal point of the beam, i.e., focusing the power on a larger or smaller area, thereby controlling the power density on the RX antenna 104 (FIG. 1). This is a critical feature in power beaming applications which can increase the power conversion efficiency $$\left(\frac{P_{Out}}{P_{RX-out}}\right)$$

on the receiver side. The capability to adjust the power density on the receiver 106 allows for maximizing the rectifying efficiency, thus boosting the entire efficiency of the system.

The first step shown in FIG. 3A as mentioned is conventional beam scanning. The second step illustrated in FIG. 3B as mentioned is range focusing along the axis of the transmitter (TX) antenna 102. The third step depicted in FIG. 3C is beam broadening for adjusting the power density on the target 106. As mentioned, this step allows for adjusting the shape of the focal point of the beam and focusing the power on a larger or smaller area. Power density adjustment is a critical feature in power beaming applications as it can increase the power conversion efficiency on the receiver side.

The embodiments discussed herein, are designed to accomplish all three beam adjustments, as shown in FIGS. 3A-C, via mechanical manipulations in an efficient way so that the moving object 106 does not see an interruption or reduction of power.

Figure 4:
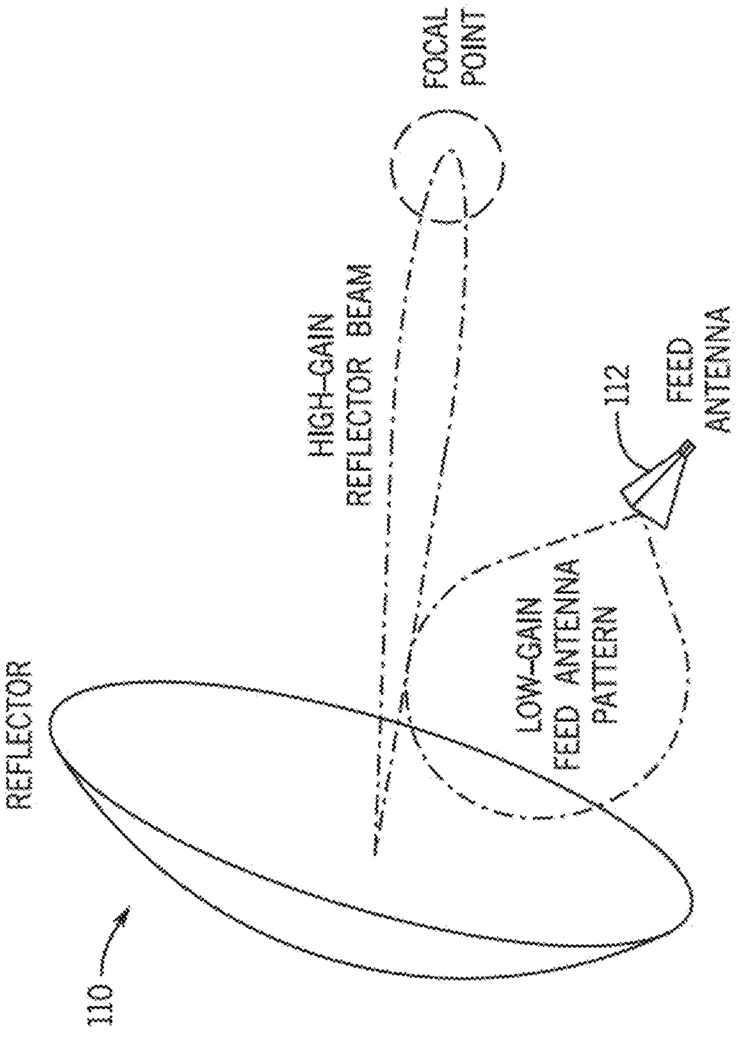
FIG. 4 is a schematic drawing operation of a reflector antenna consisting of a low-gain feed antenna and reflector plane.

Mechanically Reconfigurable Reflector Antenna. The invention uses a mechanically reconfigurable reflector antenna 110, e.g., a reflectarray 108 as shown FIGS. 7A and B, capable of moving the focal point of the power in three dimensions, which makes it an ideal solution for power beaming to moving objects 106. The operation of a standard reflector antenna 110 is demonstrated in FIG. 4. Reflector antennas 110 are known for generating a high-gain radiation pattern by focusing the power reflected from a low-gain feed antenna 112. Among numerous antenna options, reflector antennas stand out due to their high-power performance and superior focusing capabilities, technically referred to as high-gain characteristics.

Figure 5C:
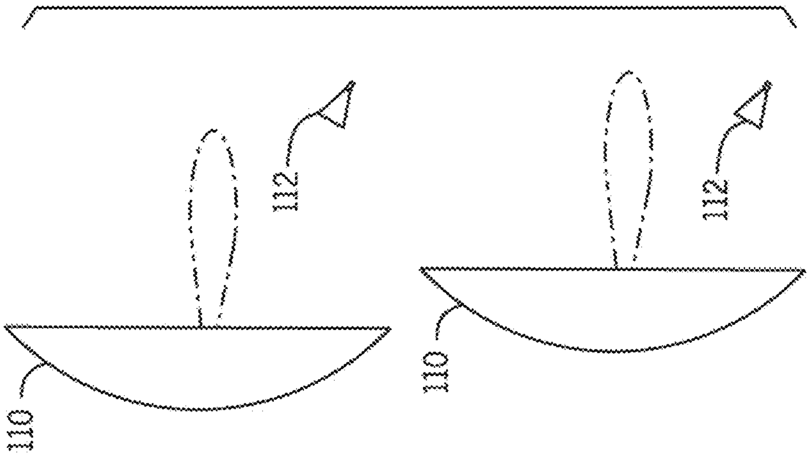
FIG. 5C illustrates beam broadening by adjusting the distance between the feed antenna and the reflector antenna.
Figure 5B:
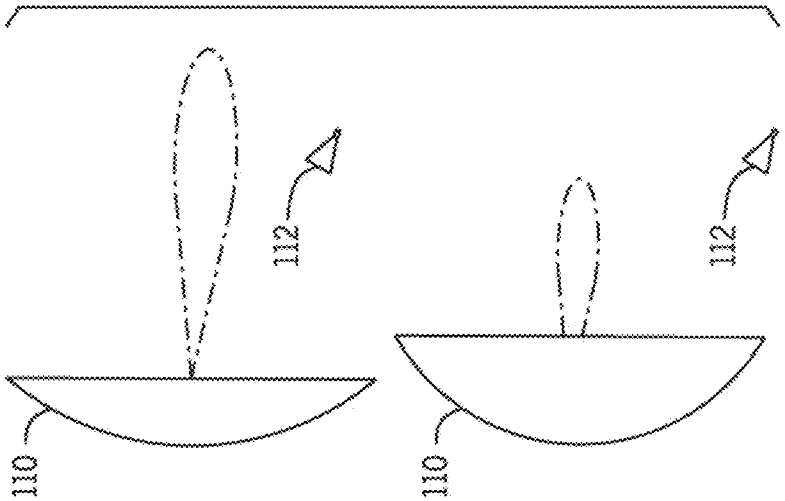
FIG. 5B illustrates adaptive longitudinal range focusing by adjusting the curvature of symmetric reflector antenna.
Figure 5A:
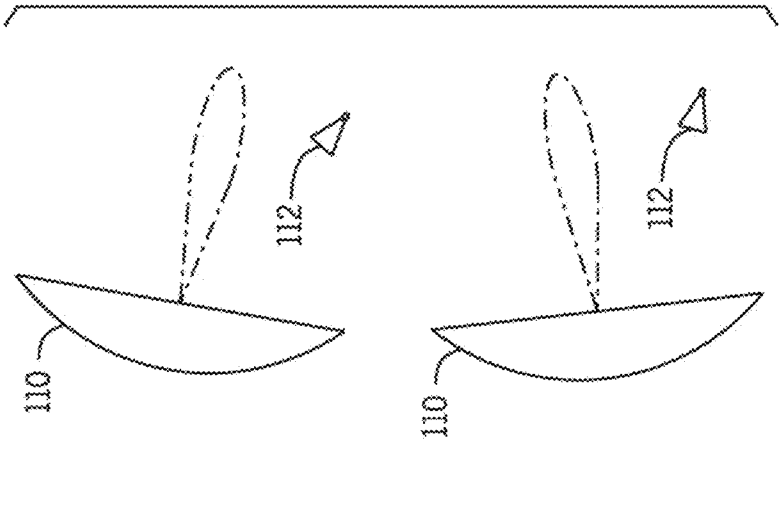
FIG. 5A illustrates mechanical scanning by rotating the reflector and the feed antennas.

This invention introduces a reconfigurable reflector antenna 110 capable of executing all three beam adjustments mentioned in FIGS. 3A-C. Therefore, the focal point of power can be swiftly moved and broadened or focused in three dimensions, enabling power delivery to moving objects 106. The invention incorporates three mechanical adjustments to accomplish the three beam adjustments in FIGS. 3A-C. The choice of mechanical adjustments is for maximum power delivery to the target 106 in motion, a critical criterion in wireless power beaming systems for moving targets. This maximum power delivery is achievable through the concurrent existence of these three mechanical adjustments. FIGS. 5A through 5C illustrate the operation of a reconfigurable reflector antenna 110 to achieve these mechanical adjustments.

Mechanical Rotation for Beam Scanning. Referring to FIG. 5A, the first adjustment involves conventional mechanical scanning, i.e., the simultaneous rotation of the reflector 110 and feed antenna 112 around their axes for azimuth and elevation scanning. This mechanical scanning is depicted in FIG. 5A.

Mechanical adjustment of Reflector Curvature for Range Focusing. Referring to FIG. 5B, the second adjustment involves mechanically changing the curvature of the reconfigurable antenna 110 for adjusting the range of the beam focal point along the reflector axis. This is illustrated in FIG. 5B, where the location of the focal point can be adjusted along the axis of the circular reflector. This reconfiguration of the curvature ensures maximum power delivery to targets 106 moving closer or farther away from the transmitting reflector antenna 110. It is worth mentioning that the first mechanical scanning step is a prerequisite for this second range focusing step, as it aligns the target 106 along the axis of the reconfigurable reflector 110. Subsequently, the mechanical adjustment of the symmetric reflector curvature is intended to bring the focal point onto the target 106.

Mechanical Adjustment of Focal Distance for Beam Broadening. Referring to FIG. 5C, the third adjustment involves altering the focal distance, i.e., the distance between the feed antenna 112 and the reflector antenna 110. This is demonstrated in FIG. 5C. The combination of this adjustment and the reflector curvature adjustment can change the location, shape and power density of focal point for maximum power recovery at receiver antenna 104. The invention can be implemented with a relatively light antenna system that is easier to rotate and scan. Adjusting the focal distance also allows for controlling spillover loss by maximizing the interception of power radiated by the feed antenna 112.

The fully controlled reconfigurable reflector discussed herein has specific features that make it well suited for wireless power beaming applications. These features are listed below. It is important to note that many of these features are realized due to the three mechanical adjustments mentioned above.

Mechanical scanning ensures that the main beam is always directed at the boresight of the reflector, resulting in zero scanning loss. This distinguishes the proposed solution from electronic scanning methods, which experience significant scanning loss, particularly when scanning at severe angles from the boresight. Consequently, the mechanical scanning in this technology facilitates maximum power delivery to moving objects, making it a superior solution for wireless power beaming applications.

The mechanical adjustments of the reflector profile provide an efficient solution for adaptive range focusing, ensuring maximum power delivery to a target 106 moving toward and away from the transmitter. This capability allows for continuous control of the focal point of power over a wide dynamic range, utilizing a true time delay solution. This approach relies on mechanical scanning, where the combined effects of mechanical scanning and adaptive range focusing maintain the focal point of power on the target. Initially, mechanical scanning directs the antenna beam toward the target 106, while adaptive range focusing subsequently adjusts the focal point of the beam precisely onto the target 106. Therefore, the synergistic effects of these mechanical adjustments ensure continuous and efficient power delivery to moving targets 106.

Figure 7A:
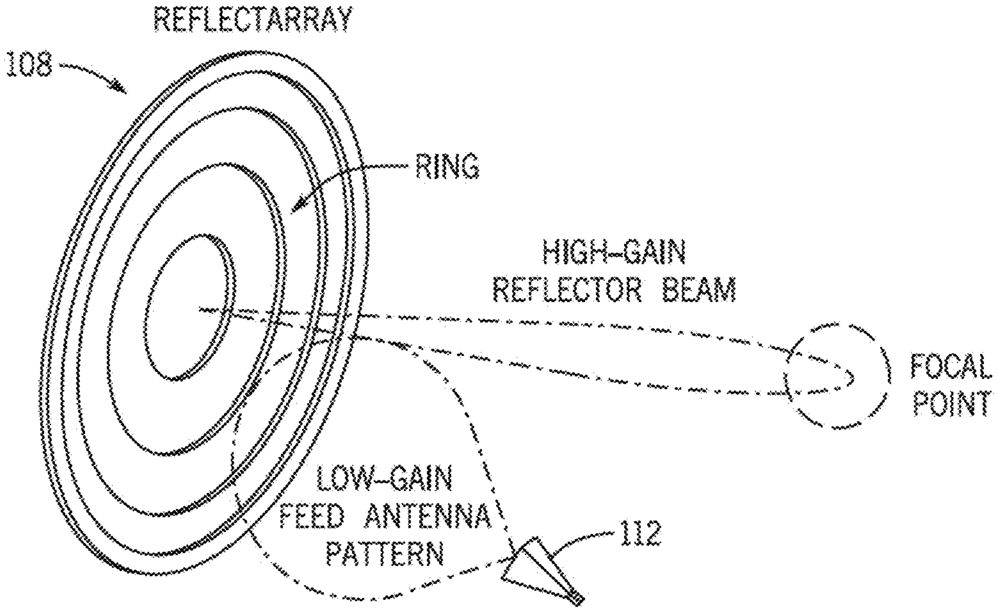
FIG. 7A shows a reflectarray antenna consisting of a low-gain feed antenna and reflectarray plane configured in accordance with an exemplary embodiment of the invention.
Figure 7B:
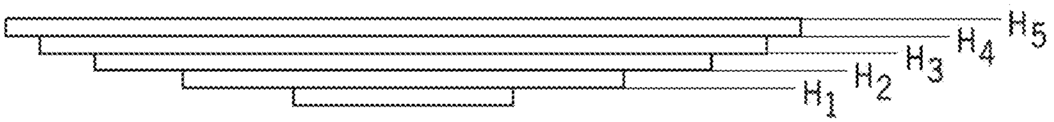
FIG. 7B shows a side view of the reflectarray plane.

Referring to the embodiment in FIGS. 7A and 7B, all components of the proposed antenna, including the feed antenna 112 and reflectarray 108, are constructed from metals, with no lossy RF substrate involved. This design choice minimizes losses within the TX antenna, thereby maximizing the efficiency parameter $$\frac{P_{TX-out}}{P_{TX-in}}.$$

Metals are selected for their high conductivity and low resistivity, ensuring minimal energy loss throughout the transmission process.

The symmetric structure of the circular reflectarray 108 enables adaptive power focusing by adjusting a single parameter: the curvature profile of the reflector 108. This design simplifies the focusing process, allowing precise control over the focal point of the beam without the need for complex adjustments.

Figure 6:
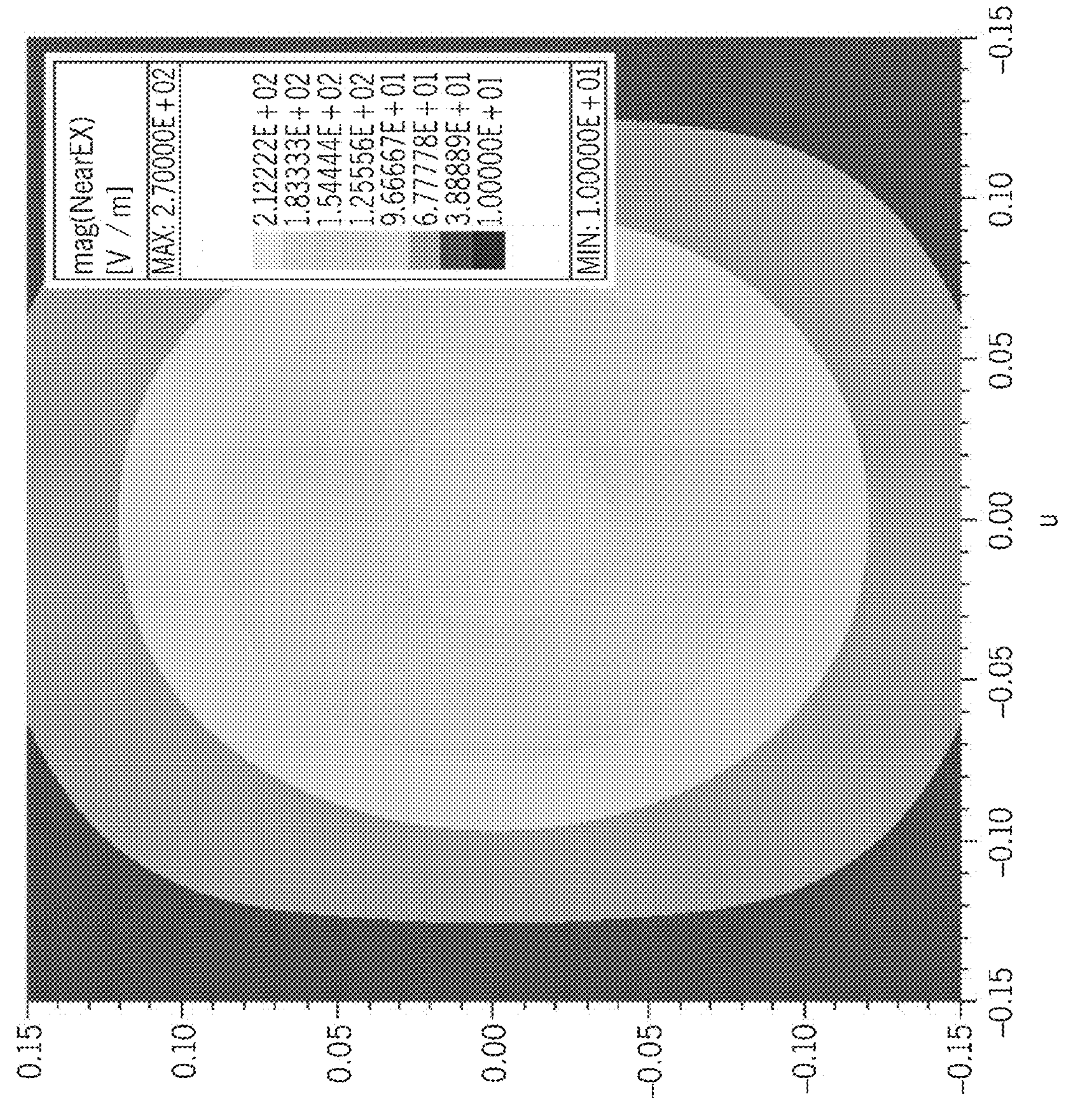
FIG. 6 illustrates power density data at the planar cross section of the focal point of the TX antenna beam within a 0.3 m*0.3 m area which is an illustrative aperture of RX antenna.

The combined mechanical adjustments of the reflector curvature and focal distance enable precise control of the power density at the focal point. Representative data are illustrated in FIG. 6, demonstrating focused power density. Broadening the beam, on the other hand, leads to a uniform power density, or more uniform power density, but targets a larger volume. This capability is crucial for enhancing the efficiency of the receiver $$\left(\frac{P_{Out}}{P_{RX-out}}\right)$$

in power beaming technologies. By controlling the power density at the receiver 106, it becomes feasible to optimize the operation of rectifier 114, FIG. 1, to their maximum efficiency point, thereby enhancing the overall efficiency of the system.

Both on-axis and off-axis feed antennas 112 can be used, with the latter exhibiting zero feed blockage loss, making it particularly suitable for maximizing power efficiency $$\left(\frac{P_{TX-out}}{P_{TX-in}}\right).$$

Below are described various ways for implementing the mechanical adjustments outlined in FIGS. 5A through 5C. Of these adjustments, adjusting the reflector curvature is the most challenging. A mesh reflector structure of the type that has been practiced for folding the entire structure of a deployable antenna for small satellites can be used. A similar technique can be used to adjust the profile of the reflector antenna. The adjustments of the ribs in such a structure allows for controlling the curvature of the reflector plane, see Chahat et al., "Ka-band Deployable Mesh Reflector Antenna Compatible with the Deep Space Network," 2017 11th European Conference on Antennas and Propagation (EUCAP), IEEE.

Mechanical Reconfigurable Reflectarray Antenna. Another embodiment involves the use of a reflectarray antenna 108 depicted in FIG. 7A. A reflectarray antenna 108 operates in a similar manner as a traditional reflector antenna, with the key difference being that beam collimation is achieved through phase adjustment on the reflectarray plane rather than by true time delay, as in reflector antennas. Consequently, the reflectarray 108 typically features a flat plane, where the phase of the incident field from the low-gain antenna is adjusted.

The reflectarray 108 in FIGS. 7A and 7B is a full metal reflectarray, where phase adjustment is achieved by varying the height of the reflection points on the reflectarray aperture, as shown in FIGS. 7A and 7B. This approach enables full phase compensation, allowing for 360-degree phase adjustments by continuously changing the height of the reflection points at each location.

Figure 8A:
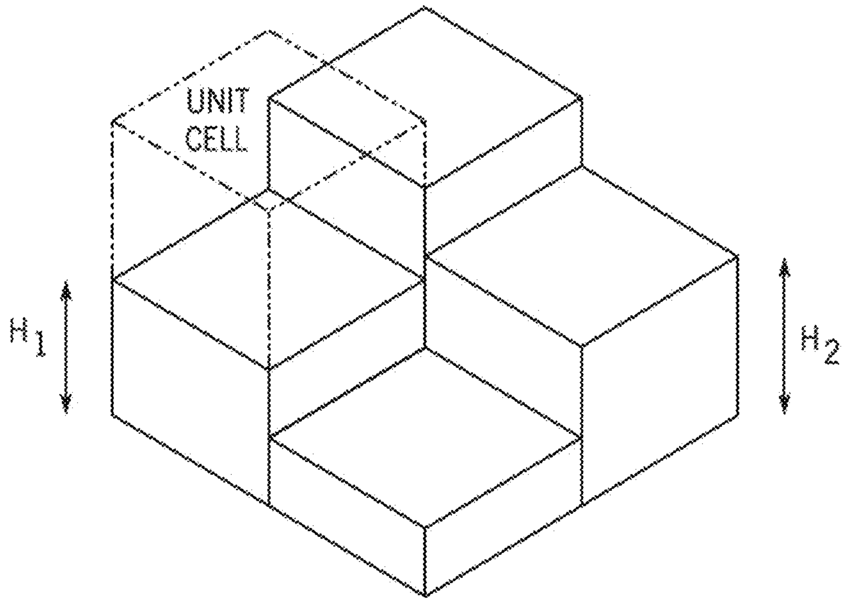
FIG. 8A illustrates representative metallic blocks of a reflectarray architecture.
Figure 8B:
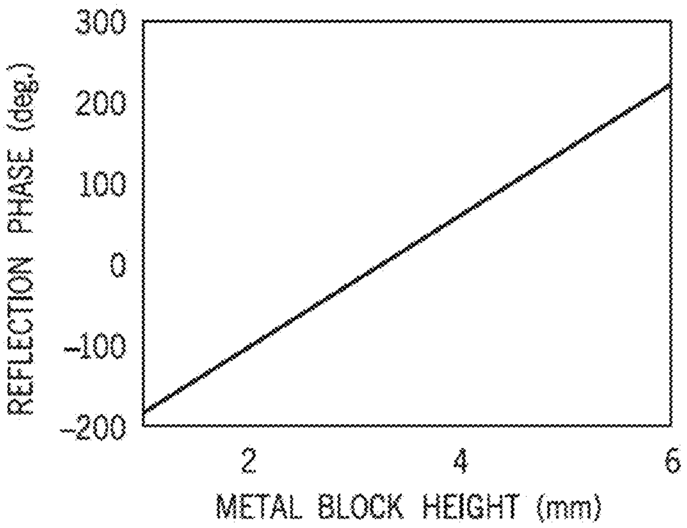
FIG. 8B is a plot showing reflection phase of each unit versus different heights of the block. The illustrative simulation was carried out at 95 GHz, resulting in an approximate 3-mm change in the height of the block yielding full phase (360 degree) compensation.

FIGS. 8A and B illustrate modeling, where a rectangular metallic unit cell of a reflectarray was modelled. As shown in FIG. 8B, continuous 360-degree phase change can be achieved by continuously varying the block height equivalent to one wavelength. The use of full metal minimizes the loss involved in phase adjustment, and full phase compensation reduces phase discretization loss. These collective features make this design an ideal solution for wireless power beaming.

The reflectarray 108 in FIGS. 7A and 7B is mechanically reconfigurable and capable of implementing all three beam adjustments depicted in FIGS. 3A through 3C. The reflectarray 108 features three mechanical adjustments, with the first and third being identical to those of the reflector antenna. The key difference is in the second mechanical adjustment for longitudinal range focusing, which is discussed below.

Mechanical adjustment of the Heights of Rings for Beam Focusing. The second adjustment involves changing the height of each ring on the reflectarray plane 108 for adaptive power focusing along the reflector axis. This can be considered a discretized version of the continuous curvature adjustment of a reflector, with the advantage of potentially being easier to implement and yielding greater precision. Each ring or disc can have its height adjusted by a dedicated micromotor, allowing full height adjustment of the reflectarray 108 with just a few micromotors.

It is worth noting that this simple implementation with a symmetric design is only possible when the reflectarray 108 is facing the target, i.e., the first mechanical scanning has already aligned the target 106 along the axis of the reflectarray 108. This combined mechanical adjustment enables straightforward implementation.

The presence of mechanical scanning allows the reflectarray design to be implemented with multiple rectangular blocks (shown in FIG. 8A) or with metallic rings, as shown in FIG. 7A. The area of a metallic ring includes many rectangular blocks, so changing the height of a metallic ring with one micromotor is equivalent to adjusting many rectangular blocks at once.

Aside from the implementation process, the reflectarray 108 also possesses all the features of a more traditional reflector antenna, making it effective and efficient for wireless power beaming. Additionally, the reflectarray 108 in FIGS. 7A and 7B offers the significant advantage of being easier to implement and having more precision.

Figure 9A:
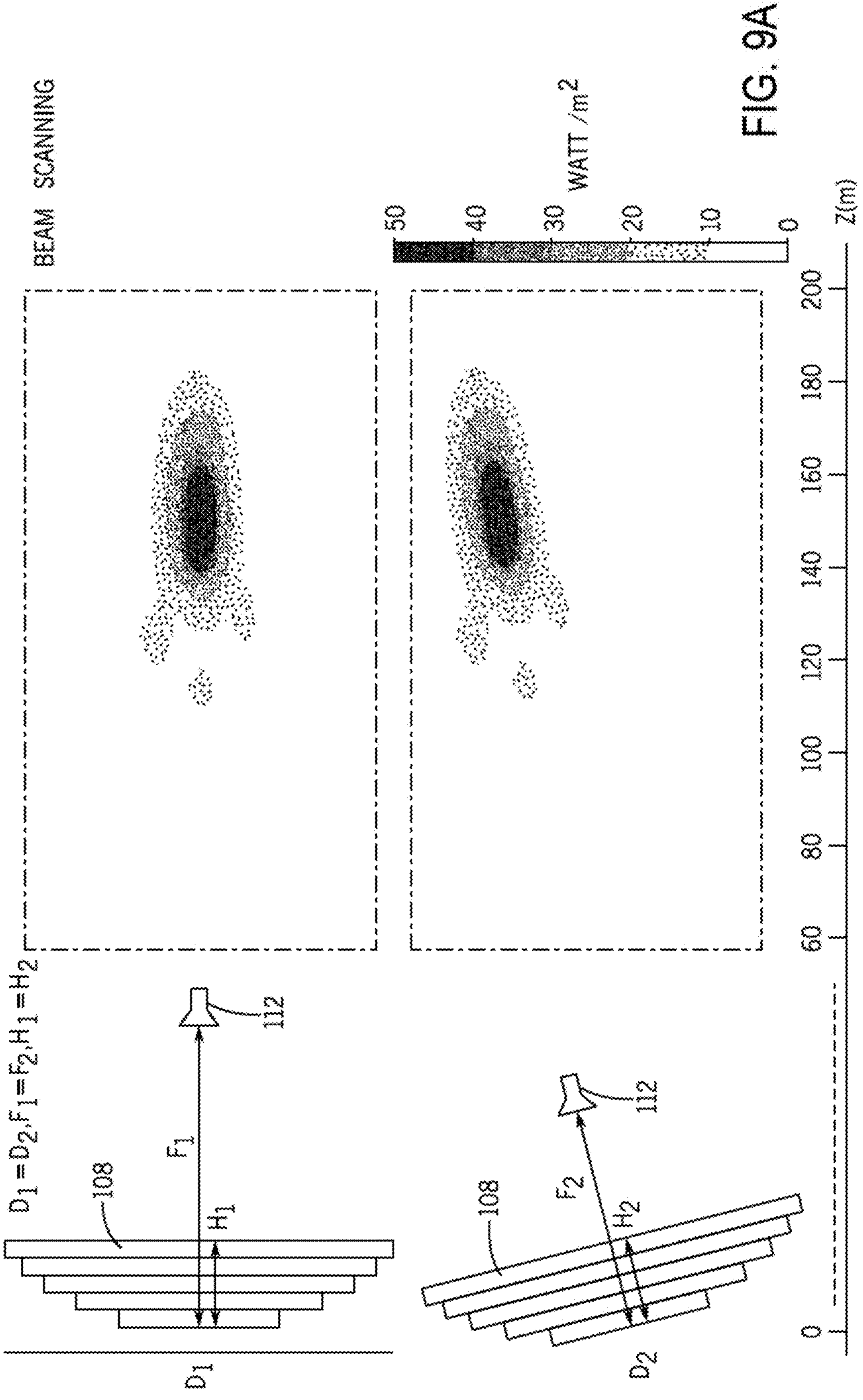
FIGS. 9A through 9C illustrates simulated power density date for an embodiment of the invention implementing a feed antenna and a reflectarray.
Figure 9B:
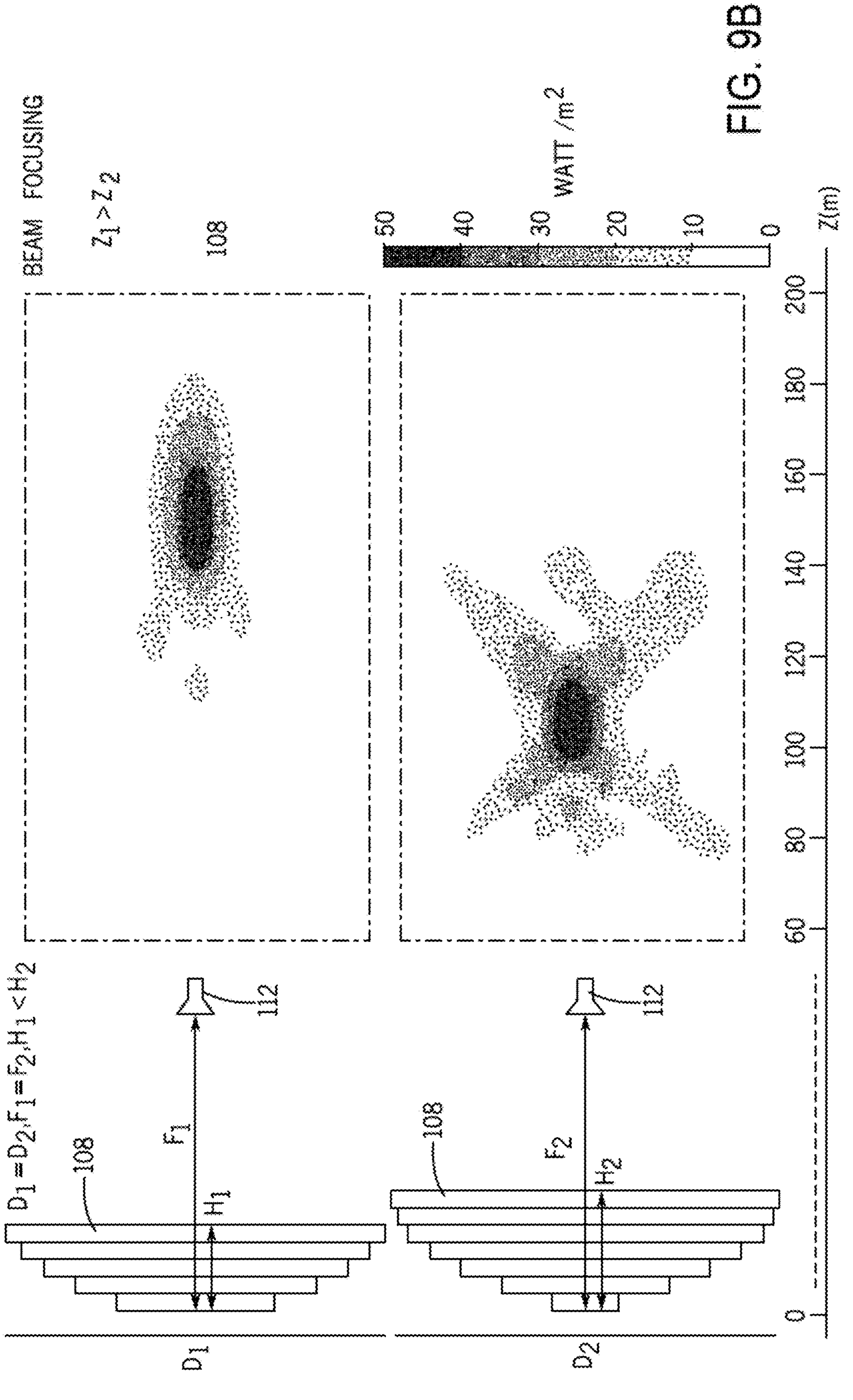
Figure 9C:
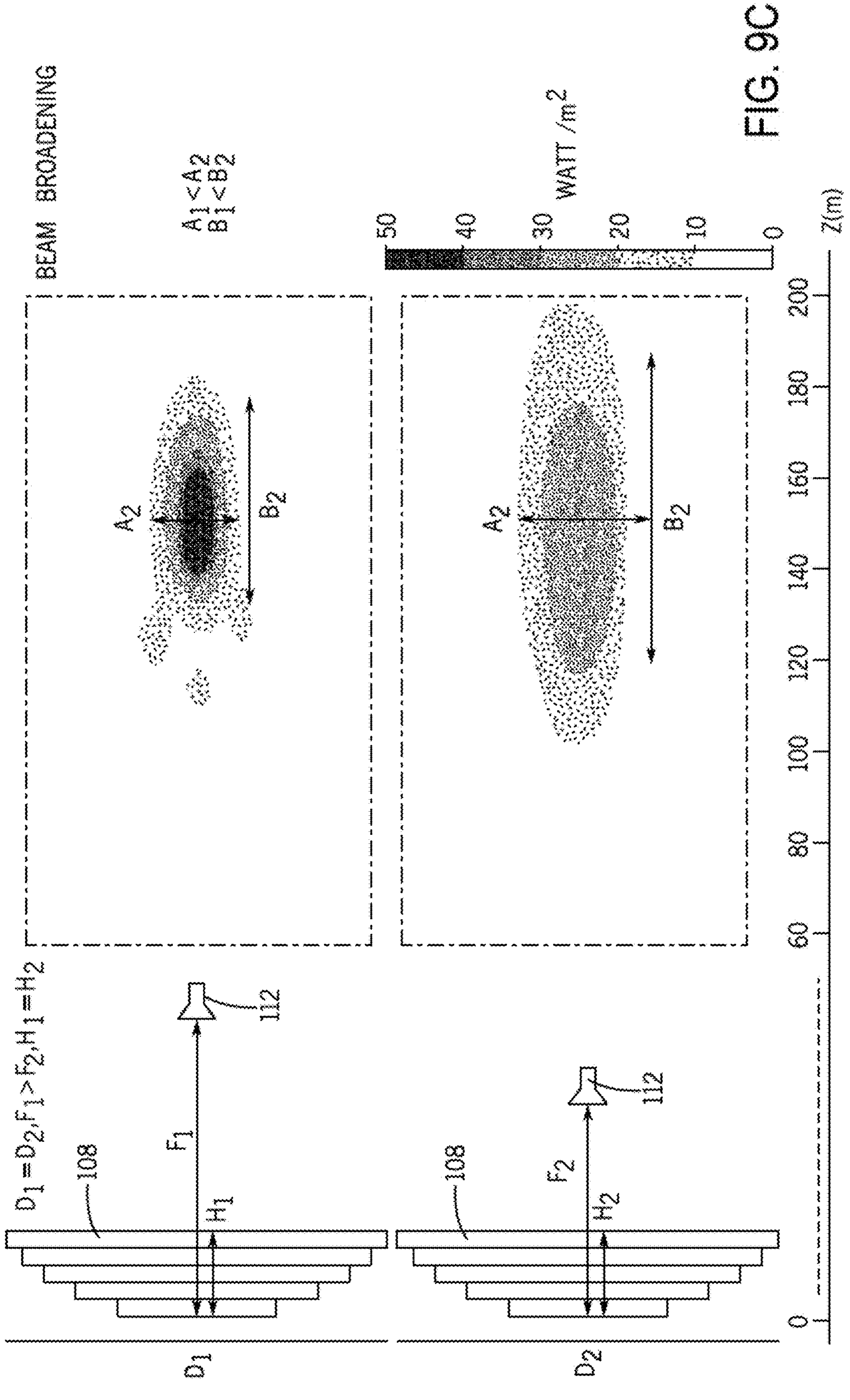

FIGS. 9A through 9C illustrates simulated power density data for an embodiment of the invention implementing a feed antenna 112 and a reflectarray 108. The reflectarray 108 is shown schematically but in the test data is representative of a reflectarray having 30 rings. FIG. 9A illustrates mechanical beam scanning in which the reflectarray 108 and feed antenna 112 are rotated in the direction of the target. The plot of simulated data illustrates that the angular location of power density moves, but the shape of the power density and the longitudinal distance from the reflectarray 108 does not change in the mechanical beam scanning step. In FIG. 9B, the shape or curvature of the reflectarray 108 is adjusted, which changes the longitudinal distance of the focal point from the reflectarray 108. The diameter of the reflectarray 108 remains constant but the effective curvature of the reflectarray 108 is adjusted by changing the relative heights of the rings. FIG. 9C illustrates the step of beam broadening, which is accomplished in FIG. 9C by moving the feed antenna 112 towards the reflectarray 108. The data in FIG. 9C shows that moving the feed antenna 112 closer to the reflectarray 108 spreads the power over greater area (i.e., beam broadening). Beam broadening is performed in tandem with adaptive range focusing to achieve the optimized power density on the receiver antenna 104.

The invention claimed is:

1. A method of wireless power beaming to a receiver antenna, the method comprising the steps of:

providing a feed antenna and a reconfigurable reflector antenna, wherein the feed antenna transmits electromagnetic energy in a low-gain pattern towards the reconfigurable reflector antenna that transmits a high-gain reflector beam;

simultaneously rotating the reflector antenna and the feed antenna around their axes for azimuth and elevation scanning to mechanically detect the directional position of the receiver antenna and positioning the axis of the reflector antenna towards the detected receiver antenna;

adjusting the location of the focal point of the high-gain reflector beam reflected from the reconfigurable reflector antenna in the direction of the receiver antenna in order to bring the focal point onto the receiver antenna; and adjusting the distance between the feed antenna and the reconfigurable reflector antenna to change the shape and power density at the focal point in order to optimize power recovery at the receiver antenna.

2. The method of wireless power beaming to a receiver antenna as recited in claim 1 wherein the receiver antenna is located on a moving object.

3. The method of wireless power beaming to a receiver antenna as recited in claim 1 wherein the reconfigurable reflector antenna is a reflectarray having a central reflective disc surrounded by concentric reflective rings wherein beam collimation is achieved through phase adjustment of the incident low-gain, beam from the feed antenna.

4. The method of wireless power beaming to a receiver antenna as recited in claim 1 wherein the height of each ring is adjusted using dedicated micromotors in order to adapt the focal point of the high-gain beam.

5. The method of wireless power beaming to a receiver antenna as recited in claim 1 wherein the reconfigurable reflector antenna is a symmetric circular reflector and the focal point of the high-gain reflector beam is adjusted by changing the curvature the reconfigurable reflector antenna.

6. The method of wireless power beaming to a receiver antenna as recited in claim 3 wherein the reconfigurable reflector antenna comprises a mesh reflector that has repositionable, radially extending ribs that are moved in unison to adjust the curvature of the meh reflector.

7. The method of wireless power beaming to a receiver antenna as recited in claim 1 wherein the receiver antenna is part of a receiver that also includes a rectifier that converts received electromagnetic energy into direct current (DC) power.

8. The method of wireless power beaming to a receiver antenna as recited in claim 1 wherein the feed antenna is an off-axis feed antenna resulting in zero blockage loss.

* * * * *